July 17, 1956  R. GALLAY  2,754,938
BRAKE PRESSURE APPORTIONING DEVICE
Filed Aug. 14, 1953  6 Sheets-Sheet 1

INVENTOR:
ROBERT GALLAY
BY:

July 17, 1956 R. GALLAY 2,754,938
BRAKE PRESSURE APPORTIONING DEVICE
Filed Aug. 14, 1953 6 Sheets-Sheet 2

INVENTOR:
ROBERT GALLAY
BY:

July 17, 1956

R. GALLAY 2,754,938

BRAKE PRESSURE APPORTIONING DEVICE

Filed Aug. 14, 1953

INVENTOR:
ROBERT GALLAY
BY:

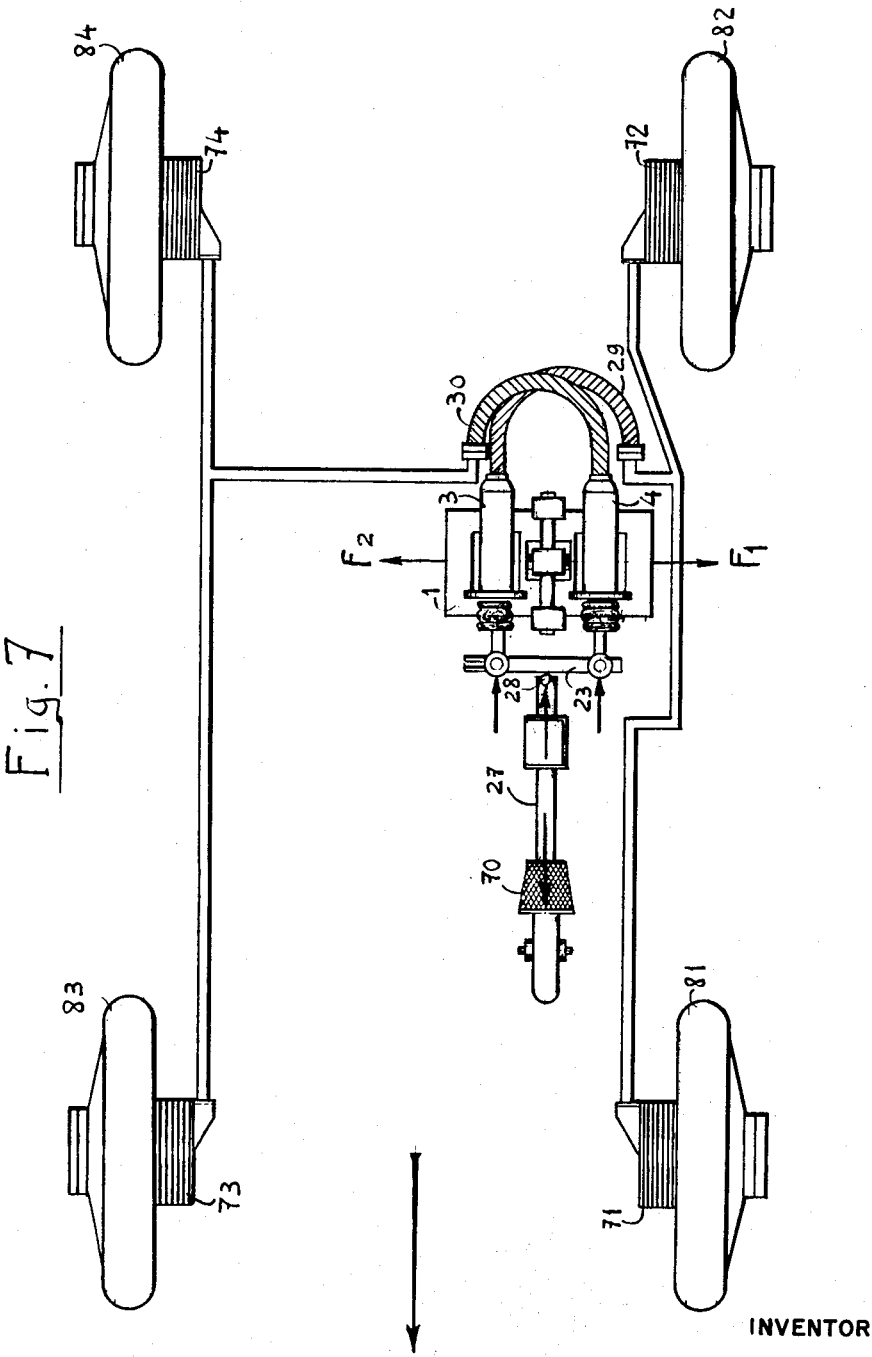

United States Patent Office 2,754,938
Patented July 17, 1956

2,754,938

BRAKE PRESSURE APPORTIONING DEVICE

Robert Gallay, Geneva, Switzerland

Application August 14, 1953, Serial No. 374,354

8 Claims. (Cl. 188—152)

This invention relates to fluid pressure braking systems for motor vehicles, and consists broadly in a device comprising at least one pair of master cylinders secured in parallel relation to each other on a slide mounted for sliding movements normally to the axes of the said cylinders under the action of an external force, one master cylinder of the pair feeding pressure fluid to the brakes of at least one right ground wheel of the vehicle and the other cylinder feeding pressure fluid to the brakes of at least one left ground wheel of the vehicle, the piston rods associated with both master cylinders being mechanically connected to one another by means of a link hinged by its one end to the one piston rod and shiftably connected at its other end to the other piston rod by means of a slideway, said link being operatively connected with the braking pedal lever at a point situated between the said connected ends of the link, and the whole being arranged so as to produce on the wheels the brakes of which are controlled by the master cylinders of the pair a differential braking action which is function of the displacements of the slide under the action of the external force.

It is well known that in an automobile going through a curve the centrifugal force acting upon the vehicle subjects the wheels on the outside of the curve to greater load than the wheels on the inside. Now, in hitherto known automobiles the four brakes, one of which is provided for every wheel, are so controlled that the braking load is as evenly distributed over all four wheels as possible. In particular the braking load is symmetrically distributed with regard to the longitudinal axis of the vehicle, in straight movement as well as in movement in a curve.

It is also well known that when driving a vehicle provided with braking means of the known kind, braking the vehicle in a curve is very dangerous, since the wheels on the inside, which are subjected to inferior load, are braked more strongly and rapidly than the outer wheels bearing the heavier load. This may lead to skidding, the vehicle being carried into an even sharper curve and easily passing on to the opposite track, or being carried off the road, thus causing serious accidents.

It is the object of this invention to overcome this drawback by providing a braking means in automobiles and the like power-driven vehicles which, when operated in a curve, will subject the outer wheels, bearing the heavier load, to a stronger braking effect, and the inner wheels to a smaller one.

In a preferred embodiment of the invention, the slide is adapted to move under the action of the centrifugal force to which the vehicle is submitted in the curves, said centrifugal force operating the slide either directly or through the medium of a pendulum.

In a further embodiment of the invention, the slide would move under the action of a control screw operated by the movements of the steering-wheel.

In the accompanying drawings:

Fig. 7 shows a schematical view of the brake means mounted in an automobile.

Figure 1:
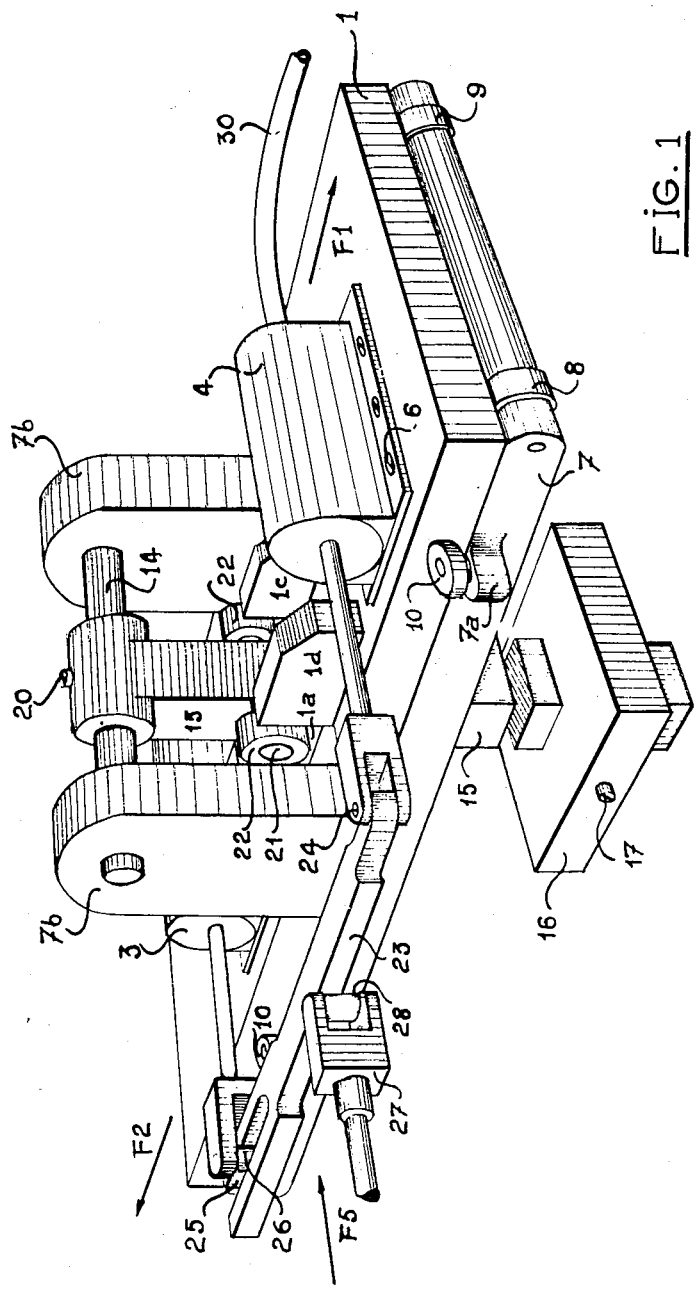
Fig. 1 is a perspective view of the first embodiment.

The fluid pressure braking control device shown in the Figures 1 to 4 comprises a slide 1, adapted for sliding movements normally to the longitudinal axis of the motor vehicle on the frame of which it is mounted. The direction of the displacements of the slide 1 is indicated by the arrows $F^1$, $F^2$. The slide 1 is formed on its cross axis with two U-shaped grooves 1a, 1b (Fig. 3) provided in two bosses 1c, 1d, respectively, arranged on both sides of the longitudinal axis of the slide 1. In those grooves there are freely lodged two ball bearings 22 mounted on a shaft 21 passing through the rod 15 of a pendulum, below the fulcrum thereof.

On the slide 1 there are secured by means of screws 5, 6, two master cylinders 3 and 4 parallel to each other and adapted to move together with the slide 1 in the direction of the arrows $F^1$, $F^2$. The slide 1 is slidingly mounted on a base plate 7 carrying at each end a pair of ball bearings 8, 9 the axes of which are horizontal. The base plate 7 is formed at its front and rear sides with a pair of bosses 7a in which are mounted ball bearings 10 having their axes directed vertically. The slide 1 rests on the ball bearings 8, 9, and is guided laterally in its longitudinal movements by the ball bearings 10. The ball bearings 9, 9, 10 insure to the slide 1 a traverse movement the friction coefficient of which is reduced to a minimum.

Figure 2:
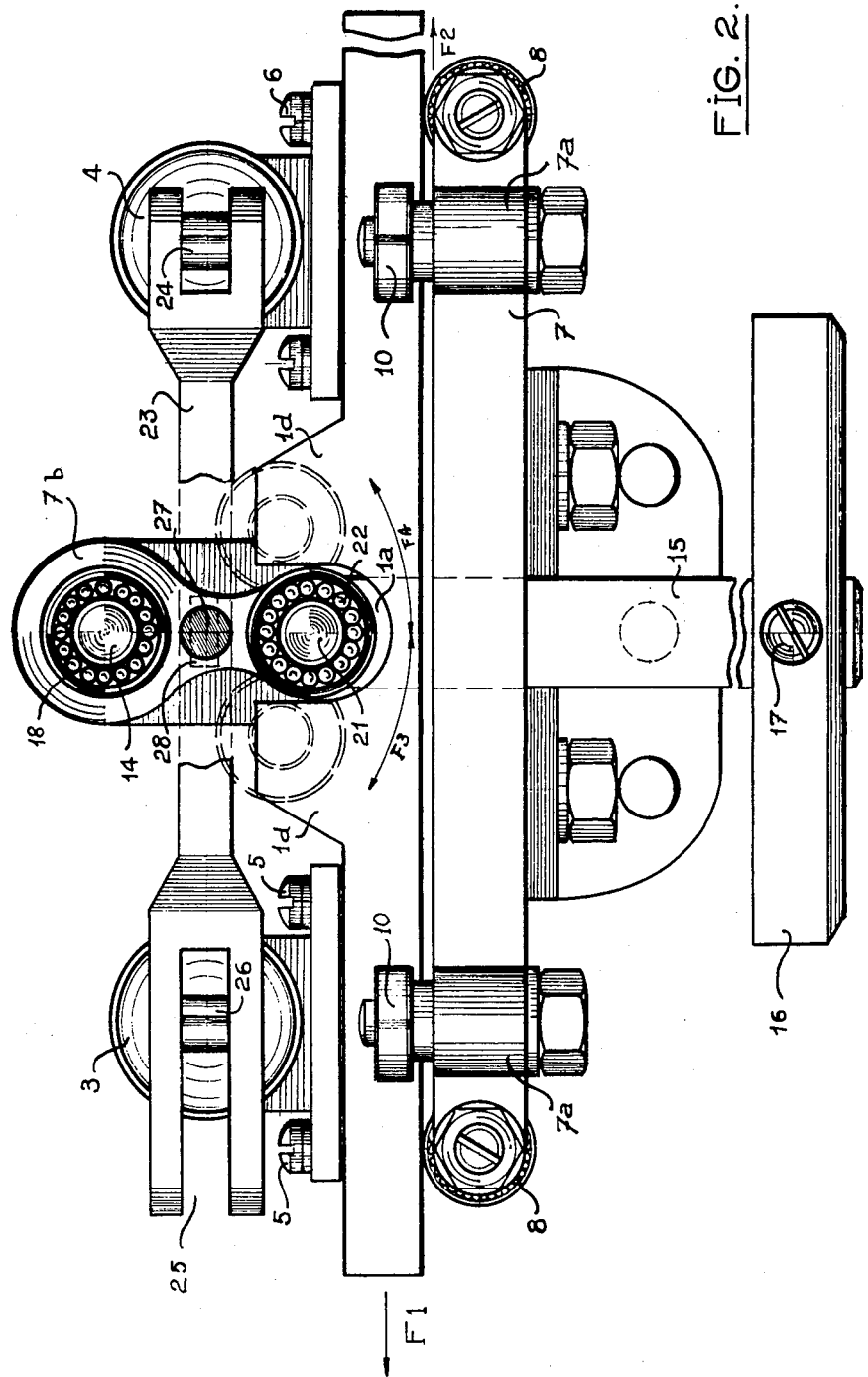
Fig. 2 is an elevational front view of this first embodiment in the position occupied by the various members thereof when the vehicle is running in a straight line.

The base plate 7 is further formed in its medial portion with two vertical brackets 7b symmetrically arranged on its front and rear sides, which allow the slide to move between these vertical brackets. In Fig. 2 the front bracket is not shown.

A pendulum comprising a rod 15 and a weight 16 adjustable along the rod by means of a screw 17 passes through apertures in the base plate 7 and in the slide 1. The pendulum is fulcrumed by means of a spindle 14 extending horizontally on the tops of the vertical brackets 7b by means of two ball bearings 18, 19. The spindle 14 is secured to the upper end of the rod 15 by means of a screw. The pendulum 15, 16 is allowed to oscillate freely about the spindle 14 in the direction of the arrows $F^3$, $F^4$.

The shaft 21 secured to the rod 15 of the pendulum parallelly and below the spindle 14 carries at each end a ball bearing 22 adapted to freely rotate in the corresponding U-shaped groove 1a, 1b of the bosses 1c, 1d of the slide 1. The master cylinders 3 and 4 are associated with pistons the rods of which are mechanically connected to one another by means of a link 23. The link 23 is connected by its one end to the piston rod of the cylinder 4 by means of a gudgeon 24 and by its other end to the piston rod of the cylinder 3 by means of a slideway 25 cooperating with a gudgeon 26. The inner end of the control rod 27 of the braking pedal (Fig. 2) carries a roller 28 resting against the link 23 and operating it, when the driver brakes, in the direction of the arrow $F^5$. The flexible delivery pipe 29 of the master cylinder 3 (Figs. 3 and 4) feeds pressure fluid to the brakes of the front and rear ground wheels which are situated on one side of the vehicle, while the flexible delivery pipe 30 of the master cylinder 4 feeds pressure fluid to the brakes of the front and rear ground wheels which are situated on the other side of the vehicle.

Figure 3:
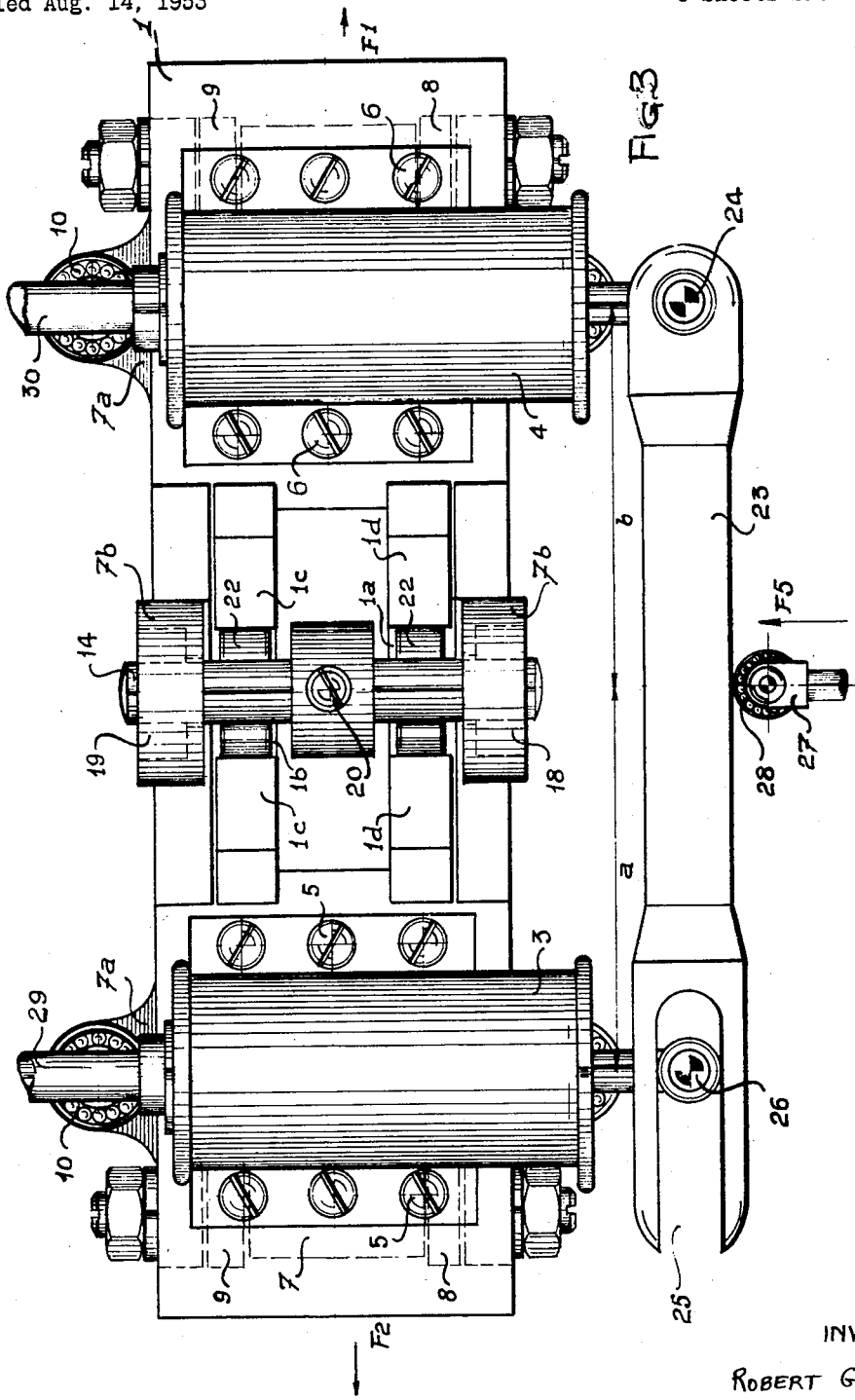
Fig. 3 is a corresponding plan view in the same position.

The operation of the device is as follows: when the motor vehicle is running in a straight line, the pendulum and the mass constituted by the slide 1 and the master cylinders 3, 4, are submitted to no centrifugal force. The pendulum remains in vertical position and the ball bearings 22 which are freely lodged in the grooves 1a, 1b do not exert any pressure against the side walls of those grooves and thus on the slide 1. The master cylinders 3, 4 secured to the slide do not move normally to their axes, thus remaining equidistant from the operating point of the roller 28 on the link 23. The distance $a$ is equal to the distance $b$ (Fig. 3). If the driver should brake at this moment, the fluid pressure obtained in the master cylinder 4 will be equal to the fluid pressure obtained in the master cylinder 3 and the braking action will be uniformly distributed on all the four wheels of the vehicle.

Figure 4:
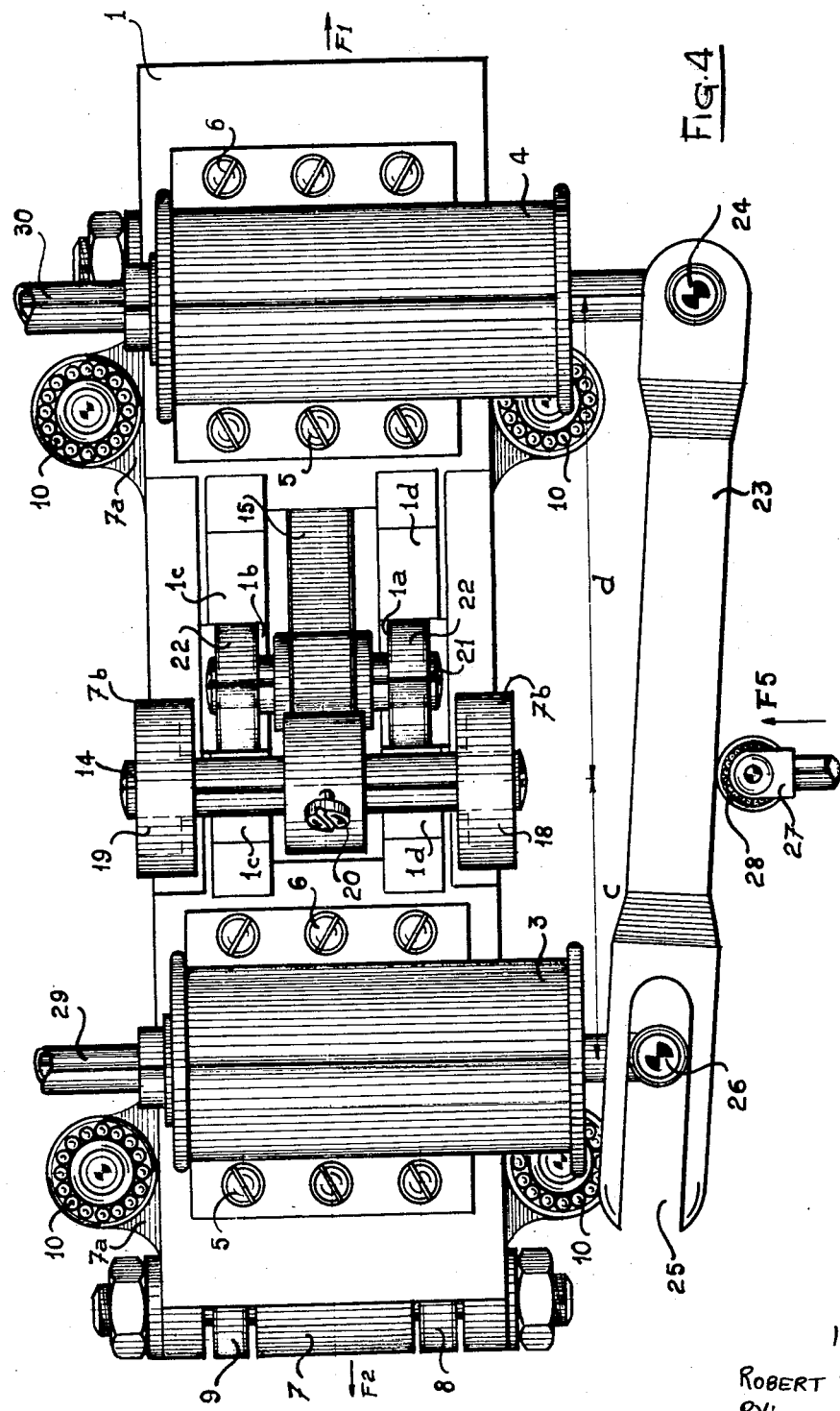
Fig. 4 is another plane view showing the members of the braking device in the position occupied when the vehicle takes a bend to the left.

On the contrary, if the vehicle is taking a bend, the centrifugal force which is proportional to the square of the speed and inversely proportional to the radius of the curve will operate the pendulum 15, 16 simultaneously and in the same direction as the slide itself; the pendulum thus oscillates about its fulcrum 14 in the direction of the arrow $F^3$ or of the arrow $F^4$ according to the bend being to the left or to the right. The ball bearings 22 will thus perform in the grooves a curved trajectory about the fulcrum 14 of the pendulum and come to occupy the end position shown in dot-and-dash lines in the Fig. 2. As these ball bearings are lodged freely in the U-shaped grooves 1a, 1b, their lateral displacement will cause a corresponding rectilinear translation of the slide 1 in the direction of the arrow $F^1$ or of the arrow $F^2$, according to the direction of the bend. The cylinders 3 and 4 fixed on the slide 1 will then effect an identical translation, and so will the link 23 which connects the outer ends of their piston rods. The axes of the cylinders 3 and 4 will thus not be longer equidistant from the operating point of the roller 28 on the link 23, as the position of this roller 28 carried by the braking pedal lever does not change. The Fig. 4 shows the lateral displacement of the pendulum and of the slide 1 under the action of the centrifugal force when the vehicle is taking a bend to the left. The pendulum 15, 16 oscillates in the direction of the arrow $F^4$ and the ball bearings 22 lodged in the grooves 1a, 1b, drive the slide 1 in the direction of the arrow $F^1$; the cylinders 3 and 4 as well as the link 23 are displaced in the same direction and the axes of the cylinders 3, 4 are no longer equidistant from the operating point of the roller 28 on the link 23. If the driver should brake at this moment, the pressure exerted in the direction of the arrow $F^5$ by the roller 28 on the link 23 will not be applied to the centre of the link but at a point situated at a distance $c$ from the cylinder 3 and at a distance $d$ from the cylinder 4, $c$ being shorter than $d$, with the result that the fluid pressure obtained in the cylinder 3 will be heavier than the fluid pressure obtained in the cylinder 4 and the braking action applied to the ground wheels of the vehicle the brakes of which are controlled by the cylinder 3 will be stronger than that applied to the wheels the brakes of which are controlled by the cylinder 4. The differential braking action thus obtained is a function of the speed of the vehicle and of the radius of the curve.

It will be noticed that the differential braking action can be also obtained in a rectilinear running when the vehicle runs on the sloping side of a barrel-road. In that case the pendulum will remain vertical, but the slide will incline itself together with the vehicle frame and become displaced together with the master cylinders towards the lowermost point of the base plate thus bringing the operating point of the roller 28 on the link 23 nearer to the axis of the uppermost cylinder. The braking action at this moment would be stronger on the wheel or wheels the brakes of which are controlled by the uppermost cylinder which is nearer to the operating point of the roller 28.

As shown in the Figures 1 to 4, the slide 1 moves in the same direction as the pendulum 15, 16 under the action of the centrifugal force. It would be possible in some cases to omit the pendulum itself, thus committing to the slide alone the function consisting of distributing the braking stress to the wheels the brakes of which are controlled by one or the other cylinder of the pair.

Figure 5:
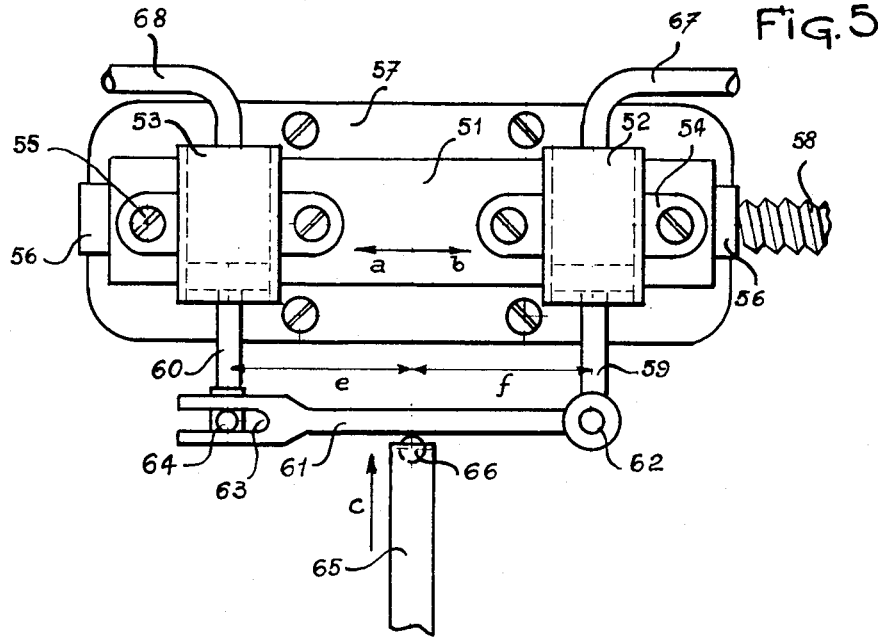
Figs. 5 and 6 are diagrammatical plane views of the second embodiment in two different positions of its members.
Figure 6:
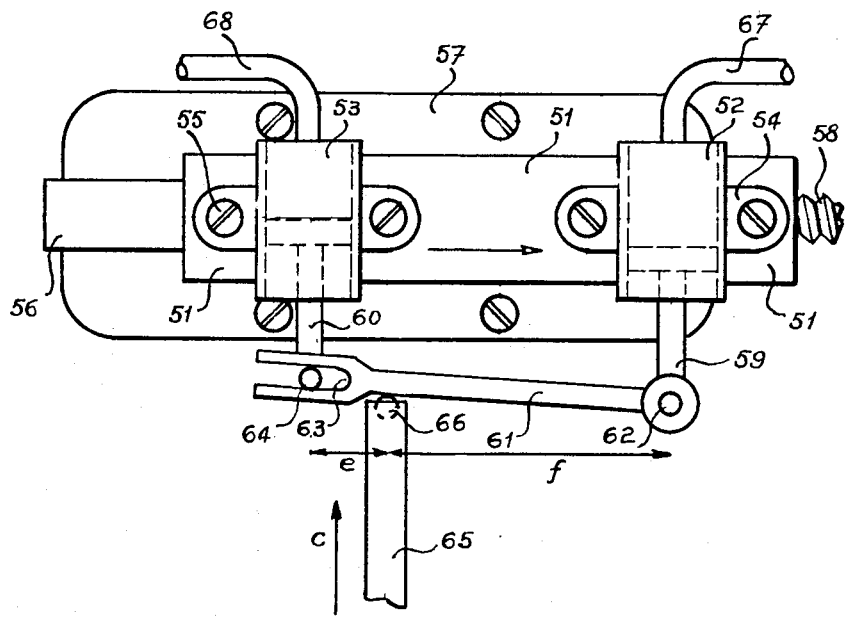

The braking control device shown in the Figures 5 and 6 comprise a slide 51 adapted to move in the direction of the arrows $a$ or $b$, normally to the axes of the master cylinders 52, 53 secured to the slide by means of straps 54, 55. The slide 51 is shiftably mounted in a slideway 56 integral with a base plate 57 fixed to the vehicle frame.

The displacements of the slide 51 on the slideway 56 can be obtained by means of a screw 58 engaging a nut (not shown) dependent on the slide. The screw 58 is operated by the movements of the steering-wheel.

The master cylinders 52, 53 are associated with pistons the rods 59, 60 of which are mechanically connected to each other by means of a link 61. This link is pivotally connected by its one end to the piston rod 59 by means of a gudgeon 62 and by its other end to the piston rod 60 by means of a slideway 63 cooperating with a gudgeon 64. The inner end of the control lever 65 of the braking pedal carries a roller 66 resting against the link 61 and operating it, when the driver brakes, in the direction of the arrow $c$. The flexible delivery pipe 67 of the master cylinder 52 feeds pressure fluid to the brakes of the front and rear ground wheels situated on the one side of the vehicle, while the flexible delivery pipe 68 of the master cylinder 53 feeds pressure fluid to the brakes of the front and rear ground wheels situated on the other side of the vehicle.

The operation of this device is like that of the braking control device shown in the Figures 1 to 4 except for the centrifugal force being replaced by a mechanical stress exerted by the screw 58 operated by the movements of the steering-wheel. When the steering-wheel is in a position corresponding to a rectilinear trajectory of the vehicle, the screw 58 allows the slide 51 to be brought in a position wherein the lever 65 of the braking pedal operates by means of the roller 66 the link 61 at a point equidistant from the axes of the cylinders 52 and 53 ($e=f$). If the driver brakes at this moment, the fluid pressure obtained in the cylinder 52 is equal to that obtained in the cylinder 53 and the braking action is thus uniformly distributed on all the four wheels. If the vehicle takes a bend to the left (Fig. 6), the rotation of the steering-wheel causes the slide to be shifted towards the right. Thus the roller 66 will rest against the link 61 nearer to the cylinder 53 than to the cylinder 52 ($e$ shorter than $f$) and if the driver brakes at this moment, that is to say during the bend, a heavier fluid pressure will be obtained in the cylinder 53 than in the cylinder 52 thus resulting in a stronger braking action on the wheels the brakes of which are controlled by the cylinder 53. When the steering-wheel is brought back to a position corresponding to a rectilinear trajectory, the roller 66 is being brought back to a position equidistant from the cylinders 52 and 53, since the screw 58 displaces the slide 51 to the left.

More particularly in Figure 7 the braking means according to the invention are shown mounted in an automobile having the four wheels 81, 82, 83, and 84, each of which is provided with a brake drum 71, 72, 73, and 74 respectively. The brake means (of the embodiment also shown in Figures 5 and 6) are operated by the brake pedal 70.

It is to be understood that in order to keep in account the action of the inertia which tends, when braking, to overload the front ground wheels and to unload the rear wheels, the device could be mounted so as to obtain a diagonally working differential braking action by controlling, for instance, by one of the twin master cylinders the right front wheel and the left rear wheel and by the other twin cylinder the left front wheel and the right rear wheel of the vehicle.

It is further to be understood that a motor vehicle could be equipped with a differential braking device comprising two pairs of master cylinders mounted on two slides so as to obtain a differential braking action on each pair of ground wheels; furthermore, both slides could be mechanically connected to each other.

What I claim is:

1. A device for controlling the fluid pressure brakes of a motor vehicle, comprising in combination a base plate secured to the vehicle frame, a slide on said base plate carrying at least one pair of parallelly arranged master cylinders, said slide being shiftable normally to the axes of said master cylinders under the action of an external force, means for feeding pressure fluid from one cylinder of said pair to the brakes of at least one right ground wheel of the vehicle and from the other cylinder of said pair to the brakes of at least one left ground wheel of the vehicle, a piston associated with each cylinder of said pair, a link pivotally connected to one of said pistons and slidingly connected to the other piston, and a lever mechanically connected with the braking pedal and operatively connected to said link at a point between said pistons, whereby to produce on the ground wheels the brakes of which are controlled by the cylinders of said pair of differential braking action which is function of the displacements of said slide under the action of the external force.

2. A device as claimed in claim 1, comprising means for shifting the slide under the action of the centrifugal force to which the vehicle is submitted in a curve.

3. A device as claimed in claim 1, comprising pendulum means for shifting the slide under the action of the centrifugal force to which the vehicle is submitted in a curve.

4. A device as claimed in claim 1, comprising a pendulum for shifting the slide under the action of the centrifugal force, said pendulum being mounted so that the centrifugal force will operate said pendulum and said slide in the same direction.

5. A device as claimed in claim 1, wherein the lever mechanically connected with the braking pedal is operatively connected with the link by means of a roller on which the link is shiftable.

6. A device as claimed in claim 1, comprising means for feeding pressure fluid from one cylinder of the pair to the brakes of both right vehicle wheels and from the other cylinder of the pair to the brakes of both left vehicle wheels.

7. A device as claimed in claim 1, comprising means for feeding pressure fluid from each cylinder of the pair to the brakes of one front wheel and one rear wheel situated diagonally.

8. A device as claimed in claim 1, comprising means for shifting the slide under the action of a mechanical force transmitted from the steering-wheel of the vehicle.

References Cited in the file of this patent

UNITED STATES PATENTS

| | | |
|---|---|---|
| 1,453,098 | Frock | Apr. 24, 1923 |
| 1,771,057 | Pentz | July 22, 1930 |
| 2,073,163 | Martin | Mar. 9, 1937 |

FOREIGN PATENTS

| | | |
|---|---|---|
| 973,210 | France | Sept. 13, 1950 |
| 383,462 | Great Britain | Nov. 17, 1932 |